US008612850B2

(12) United States Patent
Huang et al.

(10) Patent No.: US 8,612,850 B2
(45) Date of Patent: Dec. 17, 2013

(54) INFORMATION BROWSING METHOD FOR PARTITIONING CONTENTS OF PAGE AND ASSIGNING IDENTIFIERS TO DATA PARTITIONS AND RELATED MACHINE-READABLE MEDIUM THEREOF

(75) Inventors: Wei-Hung Huang, Hsinchu (TW); Ching-Chieh Wang, Yilan County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 184 days.

(21) Appl. No.: 13/006,393

(22) Filed: Jan. 13, 2011

(65) Prior Publication Data

US 2012/0185758 A1 Jul. 19, 2012

(51) Int. Cl.
*G06F 17/00* (2006.01)

(52) U.S. Cl.
USPC ........... 715/243; 715/204; 715/234; 715/246; 715/253

(58) Field of Classification Search
USPC .......... 715/204, 210, 234, 243, 273, 246, 253
See application file for complete search history.

(56) References Cited

U.S. PATENT DOCUMENTS

| | | | | |
|---|---|---|---|---|
| 6,334,131 | B2 * | 12/2001 | Chakrabarti et al. | 1/1 |
| 7,203,901 | B2 * | 4/2007 | Chen et al. | 715/205 |
| 7,441,207 | B2 | 10/2008 | Filner | |
| 7,483,960 | B2 * | 1/2009 | Kyusojin | 709/219 |
| 7,500,188 | B1 * | 3/2009 | Trapani et al. | 715/273 |
| 7,565,605 | B2 * | 7/2009 | Schohn et al. | 715/249 |
| 7,747,782 | B2 * | 6/2010 | Hunt et al. | 709/246 |
| 7,904,805 | B2 * | 3/2011 | Sequeira | 715/234 |
| 8,145,994 | B2 * | 3/2012 | Cui et al. | 715/246 |
| 2002/0170066 | A1 * | 11/2002 | Liu | 725/109 |
| 2004/0103371 | A1 * | 5/2004 | Chen et al. | 715/513 |
| 2004/0205596 | A1 * | 10/2004 | Sequeira | 715/513 |
| 2006/0036955 | A1 * | 2/2006 | Baudisch et al. | 715/747 |
| 2008/0109477 | A1 * | 5/2008 | Lue | 707/102 |

* cited by examiner

*Primary Examiner* — Stephen Hong
*Assistant Examiner* — Matthew Ludwig
(74) *Attorney, Agent, or Firm* — Winston Hsu; Scott Margo

(57) ABSTRACT

An information browsing method includes: partitioning contents of a page into a plurality of first data partitions by analyzing the contents of the page; assigning a plurality of first identifiers to the first data partitions, respectively; driving a display screen according to at least the first data partitions; and when receiving a partition selection input, determining a selected first data partition according to a first identifier corresponding to the partition selection input, wherein the selected first data partition is assigned with the first identifier.

30 Claims, 12 Drawing Sheets

INFORMATION BROWSING METHOD FOR PARTITIONING CONTENTS OF PAGE AND ASSIGNING IDENTIFIERS TO DATA PARTITIONS AND RELATED MACHINE-READABLE MEDIUM THEREOF

BACKGROUND

The disclosed embodiments of the present invention relate to presenting information on a display screen, and more particularly, to an information browsing method for partitioning contents of a page into data partitions and assigning identifiers to the data partitions and related machine-readable medium thereof.

Internet allows users to access information around the world via its huge network of connected computers. Currently, most Internet users use personal computers consisting of high speed microprocessors, accompanying peripherals, high-definition computer monitors, etc. Even for people who do have personal computers for Internet surfing, exploring the Internet in the same way they view televisions can be very attractive due to large-sized display screens of the televisions. Therefore, a need exists for displaying web page contents on a normal television display screen. Many problems exist with the implementation of this idea, however. In a typical computer environment, a computer user may easily explore the Internet by using a mouse, wherein a representative object such as a cursor can have its movement on a graphical interface controlled by hand movement. A keyboard is also used for typing website addresses, search keywords, tabbing between links, and so forth. A television user views the television for entertainment purposes and typically does not find it convenient to use a computer mouse or keyboard.

Thus, there is a need for an innovative information browsing method which allows the user to easily browse information presented on a display screen.

SUMMARY

In accordance with exemplary embodiments of the present invention, an information browsing method for partitioning contents of a page into data partitions and assigning identifiers to the data partitions and related machine-readable medium thereof are proposed to solve the above-mentioned problem.

According to a first aspect of the present invention, an exemplary information browsing method is disclosed. The exemplary information browsing method includes the following steps: partitioning contents of a page into a plurality of first data partitions by analyzing the contents of the page; assigning a plurality of first identifiers to the first data partitions, respectively; driving a display screen according to at least the first data partitions; and when receiving a partition selection input, determining a selected first data partition according to a first identifier corresponding to the partition selection input, wherein the selected first data partition is assigned with the first identifier.

According to a second aspect of the present invention, an exemplary machine-readable medium which stores a computer program is disclosed. When executed by a processor, the computer program enables the processor to perform the following steps: partitioning contents of a page into a plurality of first data partitions by analyzing the contents of the page; assigning a plurality of first identifiers to the first data partitions, respectively; controlling a display controller to drive a display screen according to at least the first data partitions; and when receiving a partition selection input, determining a selected first data partition according to a first identifier corresponding to the partition selection input, wherein the selected first data partition is assigned with the first identifier.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention is generally directed to browsing contents of pages displayed on a display screen (e.g., a television screen). For example, the pages to be displayed are web pages, and the present invention proposes a user interface allowing a user to easily and conveniently browse the web page contents on the television screen. As will be understood, the present invention is not limited to viewing web page contents and/or viewing information displayed on a television screen. For example, the present invention may be applied to any structured document (e.g., a word processing document) and/or any application with a display screen.

Figure 1:
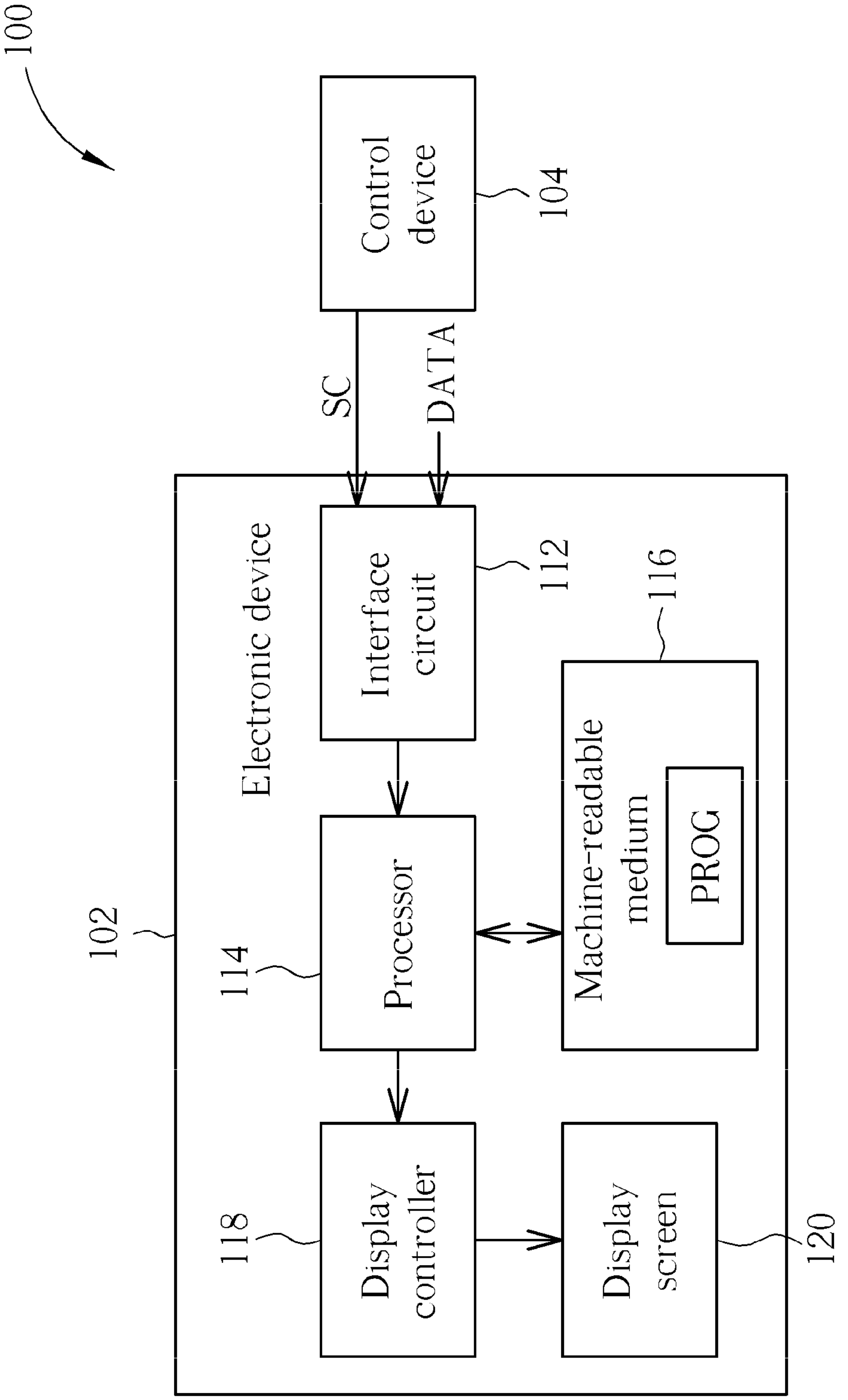
FIG. 1 is a block diagram illustrating an information browsing system according to an exemplary embodiment of the present invention.

FIG. 1 is a block diagram illustrating an information browsing system according to an exemplary embodiment of the present invention. The information browsing system 100 includes, but is not limited to, an electronic device 102 (e.g., a television) and a control device 104 (e.g., a remote control). In this exemplary embodiment, the control device 104 is external to the electronic device 102. However, in an alternative design, the control device 104 (e.g., a pointing device, a keyboard, or any control means) may be integrated within the electronic device 102 (e.g., a portable computing device or a mobile phone). This alternative design also obeys the spirit of the present invention.

As shown in FIG. 1, the electronic device 102 includes, but is not limited to, an interface circuit 112, a processor 114, a machine-readable medium 116, a display controller 118, and a display screen 120. The interface circuit 112 may include one signal receiver for receiving a control signal SC (i.e., a user input) generated from the control device 104 and another signal receiver (e.g., a network interface card) for receiving contents DATA of a page (e.g., a web page) provided from a data source (e.g., Internet). The machine-readable medium 116 is a non-transitory storage such as a flash memory, and has a computer program PROG stored/loaded therein. When executed by the processor 114, the computer program PROG enables the processor 114 to control the whole information browsing procedure directed to the contents DATA of the page. For example, the processor 114 refers to the contents DATA of the page for controlling the display controller 118 to properly drive the display screen 120 for presenting information to the user.

Figure 2:
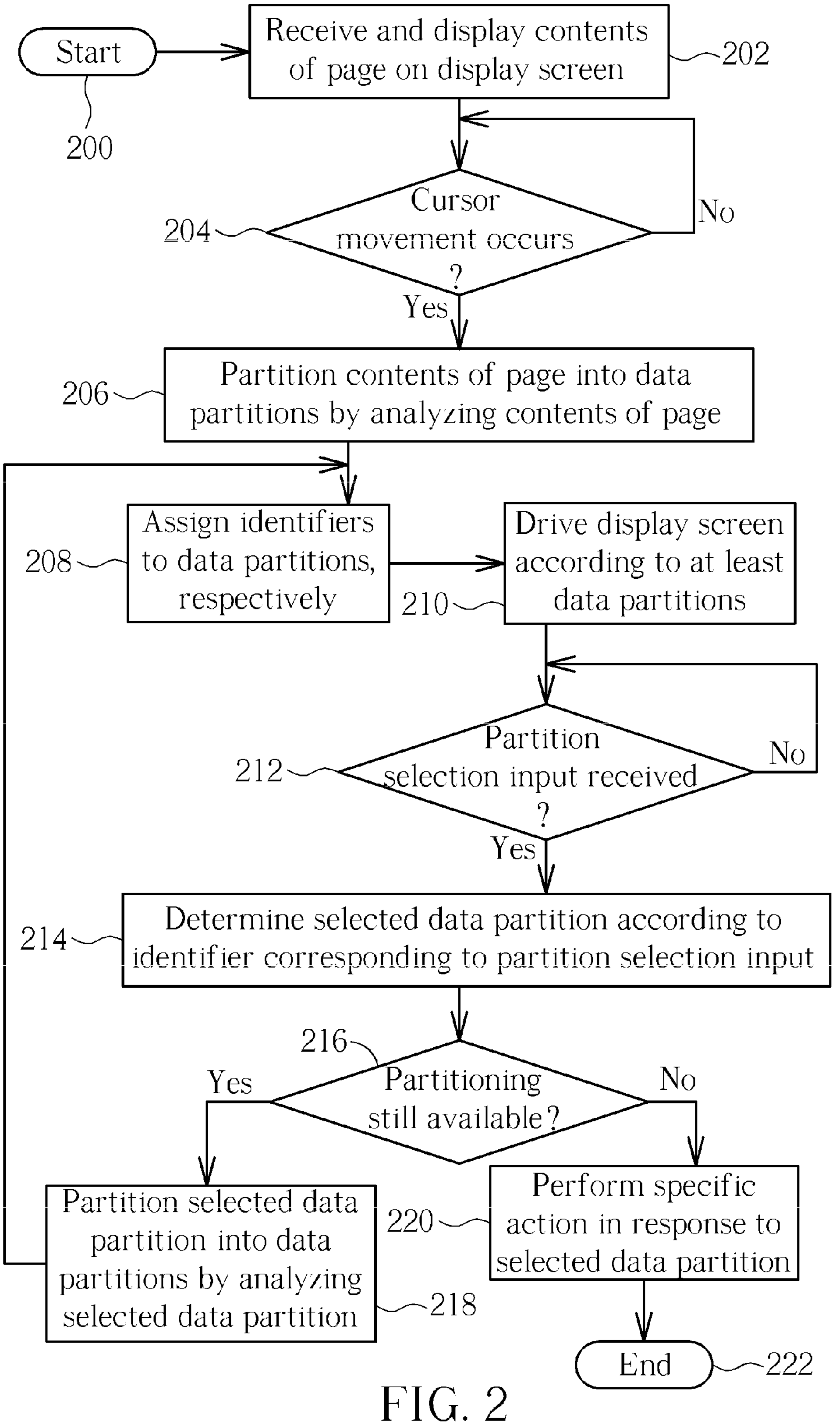
FIG. 2 is a flowchart illustrating an information browsing method according to an exemplary embodiment of the present invention.

Please refer to FIG. 2, which is a flowchart illustrating an information browsing method according to an exemplary embodiment of the present invention. Provided that the result is substantially the same, the steps are not required to be executed in the exact order shown in FIG. 2. The exemplary information browsing method may be briefly summarized as follows.

Step 200: Start.

Step 202: Receive contents of a page and display the received contents of the page on a display screen.

Step 204: Check if a cursor movement occurs. If yes, go to step 206; otherwise, execute step 204 again to keep monitoring the occurrence of the cursor movement.

Step 206: Start partitioning the contents of the page into a plurality of data partitions according to an analyzing result of the contents of the page and/or a partition mode setting.

Step 208: Assign a plurality of identifiers to the data partitions, respectively.

Step 210: Drive the display screen according to at least the data partitions.

Step 212: Check if a partition selection input is received. If yes, go to step 214; otherwise, execute step 212 again to keep monitoring reception of the partition selection input.

Step 214: Determine a selected data partition according to an identifier corresponding to the partition selection input, wherein the selected data partition is assigned with the identifier.

Step 216: Check if partitioning the selected data partition is still available. If yes, go to step 218; otherwise, go to step 220.

Step 218: Partition the selected data partition into a plurality of data partitions according to an analyzing result of the selected data partition and/or a partition mode setting. Go to step 208.

Step 220: Perform a specific action in response to the selected data partition.

Step 222: End.

As mentioned above, the processor 114 executes the computer program PROG for controlling the overall information browsing procedure. When contents DATA of a page (e.g., a web page) are received by the interface circuit 112, the processor 114 is operative to control the display controller 118 to display the received contents DATA of the page on the display screen 120 (Step 202). Next, the processor 114 checks if a cursor movement occurs. That is, when the user uses the control device 104, such as a remote control, to generate the control signal SC to the electronic device 102 for moving the cursor shown on the display screen 120, this means that the user wants to browse the information displayed on the display screen 120. Thus, the processor 114 starts partitioning the contents DATA of the page into a plurality of data partitions according to a partition mode setting (Step 206). After the data partitions are generated, the processor 114 assigns a plurality of identifiers to the data partitions, respectively, and then controls the display controller 118 to drive the display screen 120 according to at least the data partitions.

Please note that step 204 may be optional. That is, in an alternative design, step 204 may be omitted such that step 206 is performed immediately after step 202 is accomplished. Thus, partitioning contents DATA of the page without detecting the cursor movement also obeys the spirit of the present invention and falls within the scope of the present invention.

By way of example, but not limitation, the partition mode setting may be a read mode, a link mode, an input mode, or a mixed mode which includes at least two of the read mode, the link mode, and the input mode. That is, the partition mode setting may include at least one of the read mode, the link mode, and the input mode. Moreover, the data partitions are derived from analyzing the contents DATA of the page. In a case where the page to be displayed is a web page, the contents DATA therefore may be created using HyperText Markup Language (HTML). Thus, the web page arrangement can be easily known by analyzing the HTML-based source code. The present invention therefore may employ any available web page analyzing technique to parse the contents DATA for generating the required data partitions. However, this is for illustrative purposes only, and is not meant to be a limitation to the present invention. Any technique which is capable of obtaining a content analyzing result required for partitioning the contents to be displayed on the display screen may be employed.

Figure 3:
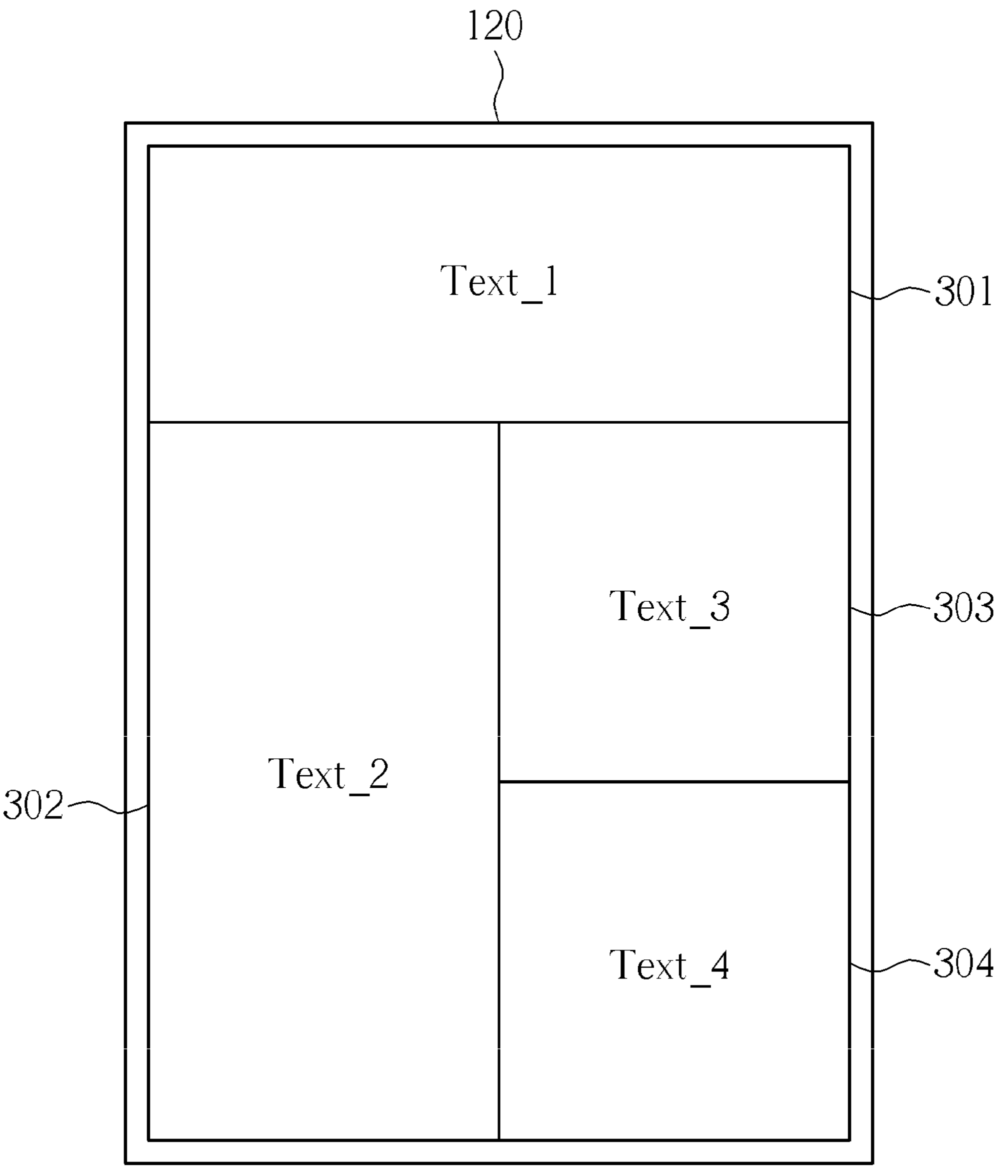
FIG. 3 is a diagram illustrating an exemplary display output of contents of a page on a display screen when a partition mode setting includes a read mode.

FIG. 3 is a diagram illustrating an exemplary display output of the contents DATA of the page on the display screen 120 when the partition mode setting includes a read mode. As shown in FIG. 3, the exemplary display output includes a plurality of display regions (e.g., 301, 302, 303, and 304) corresponding to the data partitions generated in step 206, respectively. As the read mode is activated, the data partitions would include at least one data partition which only includes pure text information to be shown on the display screen 120. In this example, the display region 301 has the pure text information Text_1 shown thereon, the display region 302 has the pure text information Text_2 shown thereon, the display region 303 has the pure text information Text_3 shown thereon, and the display region 304 has the pure text information Text_4 shown thereon.

Figure 4:
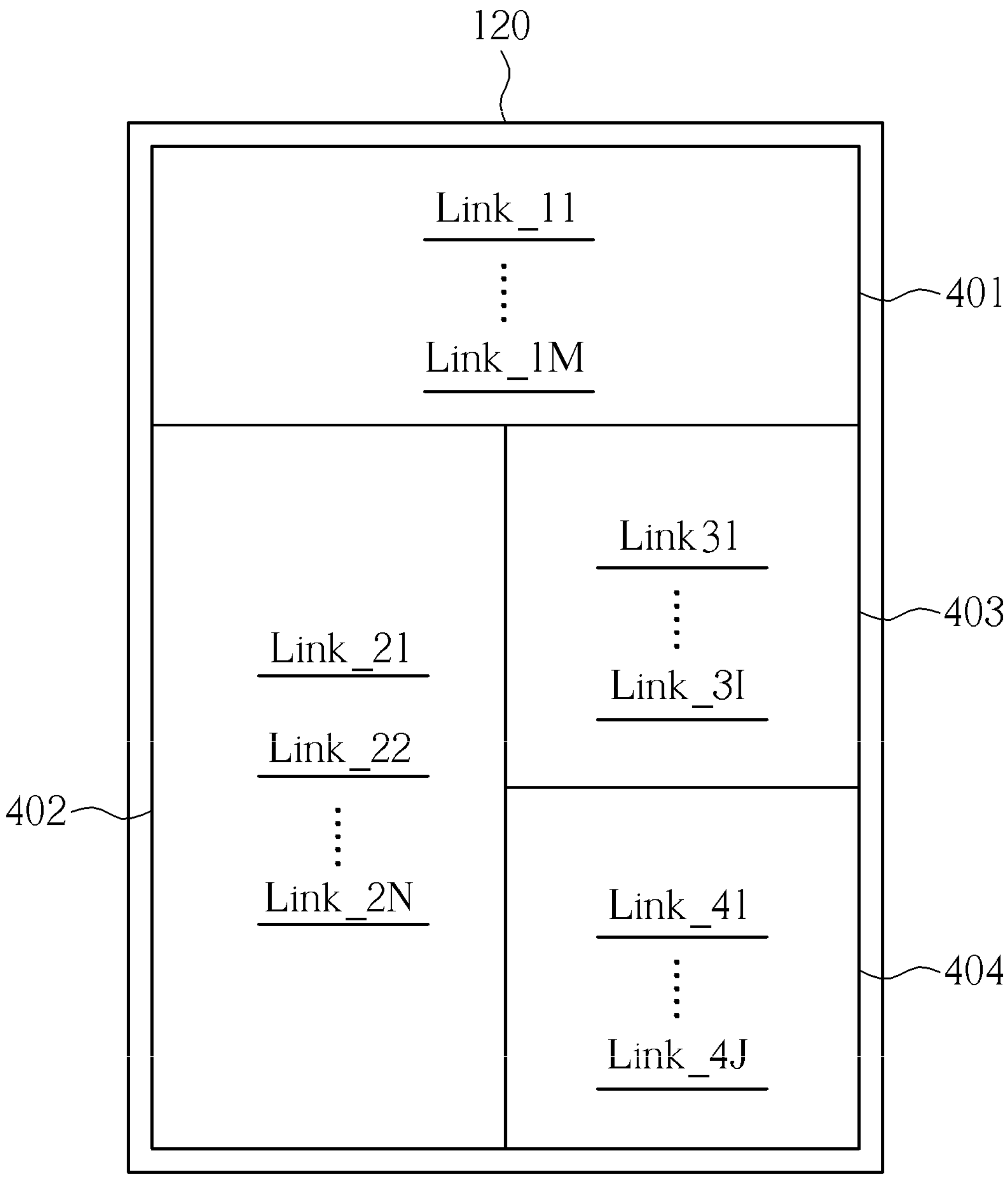
FIG. 4 is a diagram illustrating an exemplary display output of contents of a page on a display screen when a partition mode setting includes a link mode.

FIG. 4 is a diagram illustrating an exemplary display output of the contents DATA of the page on the display screen 120 when the partition mode setting includes a link mode. As shown in FIG. 4, the exemplary display output includes a plurality of display regions (e.g., 401, 402, 403, and 404) corresponding to the data partitions generated in step 206, respectively. As the link mode is activated, the data partitions would include at least one data partition which only includes one or more links to be shown on the display screen 120. In this example, the display region 401 has a link group composed of a plurality of links Link_11-Link_1M shown thereon, the display region 402 has a link group composed of a plurality of links Link_21-Link_2N shown thereon, the display region 403 has a link group composed of a plurality of links Link_31-Link_3I shown thereon, and the display region 404 has a link group composed of a plurality of links Link_41-Link_4J shown thereon.

Figure 5:
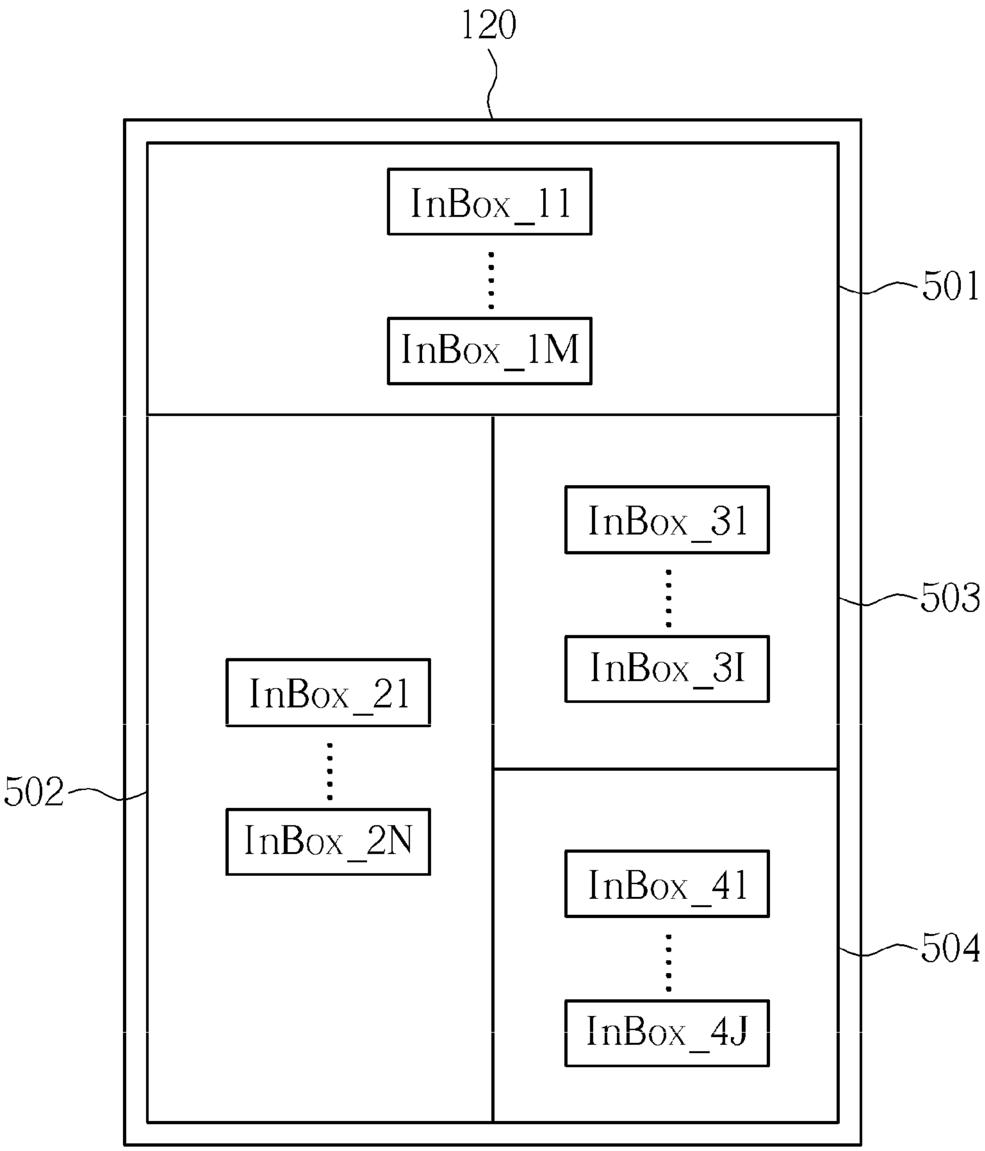
FIG. 5 is a diagram illustrating an exemplary display output of contents of a page on a display screen when a partition mode setting includes an input mode.

FIG. 5 is a diagram illustrating an exemplary display output of the contents DATA of the page on the display screen 120 when the partition mode setting includes an input mode. As shown in FIG. 5, the exemplary display output includes a plurality of display regions (e.g., 501, 502, 503, and 504) corresponding to the data partitions generated in step 206, respectively. As the input mode is activated, the data partitions would include at least one data partition which only includes one or more input boxes to be shown on the display screen 120. In this example, the display region 501 has an input box group composed of a plurality of input boxes InBox_11-InBox_1M shown thereon, the display region 502 has an input box group composed of a plurality of input boxes InBox_21-InBox_2N shown thereon, the display region 503 has an input box group composed of a plurality of input boxes InBox_31-InBox_3I shown thereon, and the display region 504 has an input box group composed of a plurality of input boxes InBox_41-InBox_4J shown thereon.

When the partition mode setting is a mixed mode, the data partitions may include at least one data partition which only includes pure text information to be shown on the display screen 120, at least one data partition which only includes one or more links to be shown on the display screen 120, and/or at least one data partition which only includes one or more input boxes to be shown on the display screen 120. In other words, each of the data partitions is determined by a specific partition mode selected from the read mode, the link mode, and the input mode, resulting in a plurality of data partitions respectively determined by different partition modes. As a person skilled in the art can readily understand the display output of the contents DATA of the page on the display screen 120 when the partition mode setting is a mixed mode, further description is omitted here for brevity.

Figure 6:
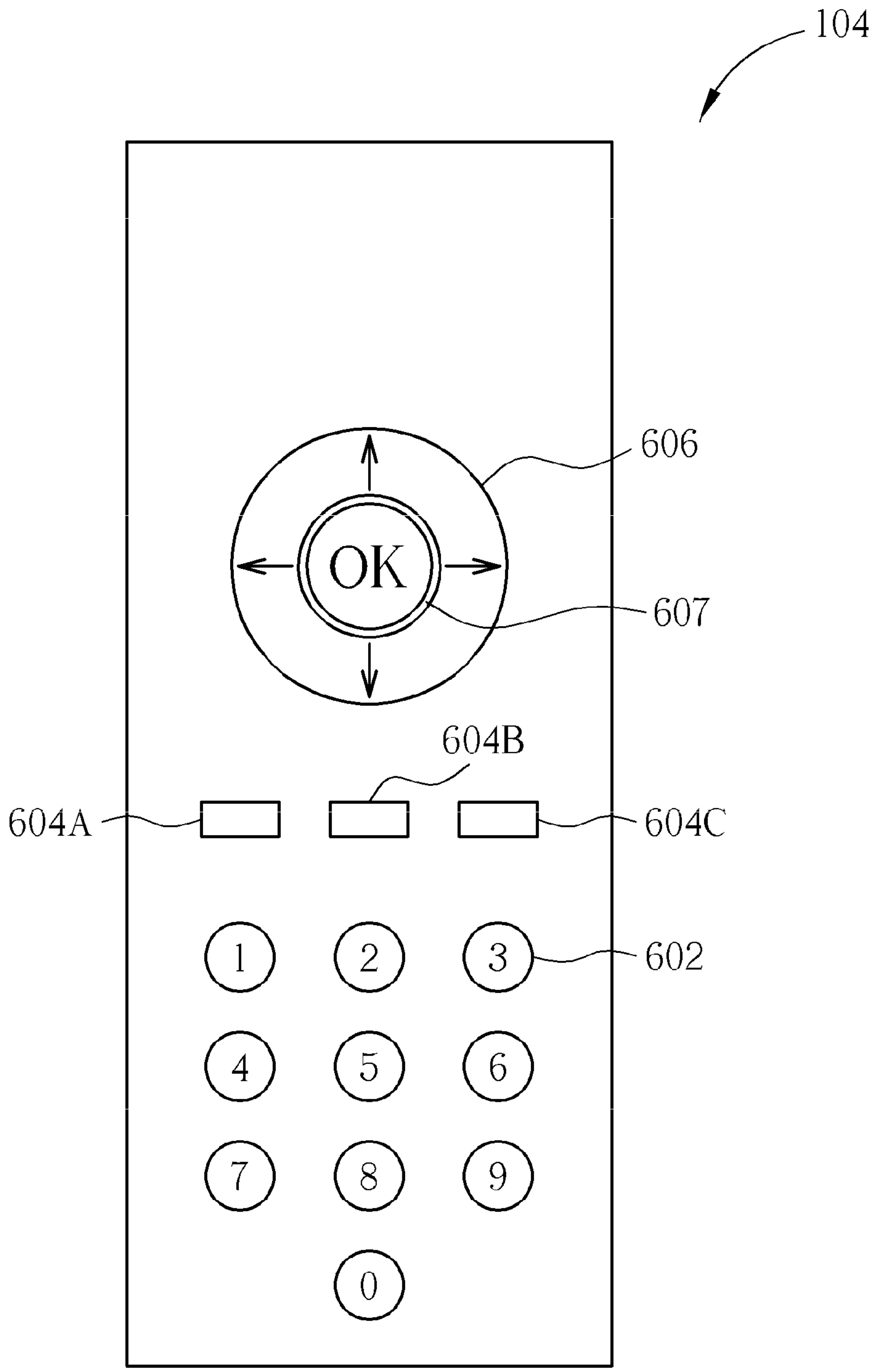
FIG. 6 is a diagram illustrating an exemplary embodiment of a control device shown in FIG. 1.

The use of the identifiers assigned to the data partitions is to realize the selection control of the generated data partitions. For example, the identifiers are particularly designed to be mapped to the buttons/keys on the control device 104. Please refer to FIG. 6, which is a diagram illustrating an exemplary embodiment of the control device 104 shown in FIG. 1. As shown in the figure, the control device 104 includes a plurality of number keys 602, a plurality of function keys 604A, 604B, and 604C, one four-way navigation key 606, and one confirmation key 607. The user may use the four-way navigation key 606 to switch from a current display region showing one data partition to a next display region showing another data partition, wherein a display output of the display screen 120 is divided into a plurality of display regions respectively showing data partitions generated in step 206. Taking the embodiment shown in FIG. 3 for example, when the current display region is the display region 301 and the user taps the four-way navigation key 606 downward, the next display region 302 is selected and then becomes the current display region. Similarly, when the current display region is the display region 302 and the user taps the four-way navigation key 606 downward, the next display region 303 is selected and becomes the current display region. Thus, with a proper setting of the switching sequence of the identifiers assigned to the data partitions, the user can select the display regions corresponding to the data partitions one by one by using the four-way navigation key 606. However, this is for illustrative purposes only. That is, other mapping relationship between the identifiers and the four-way navigation key 606 may be feasible according to actual design consideration. When the user depresses the confirmation key 607, a partition selection input corresponding to the current display region in which a selected data partition is displayed is made.

Figure 7:
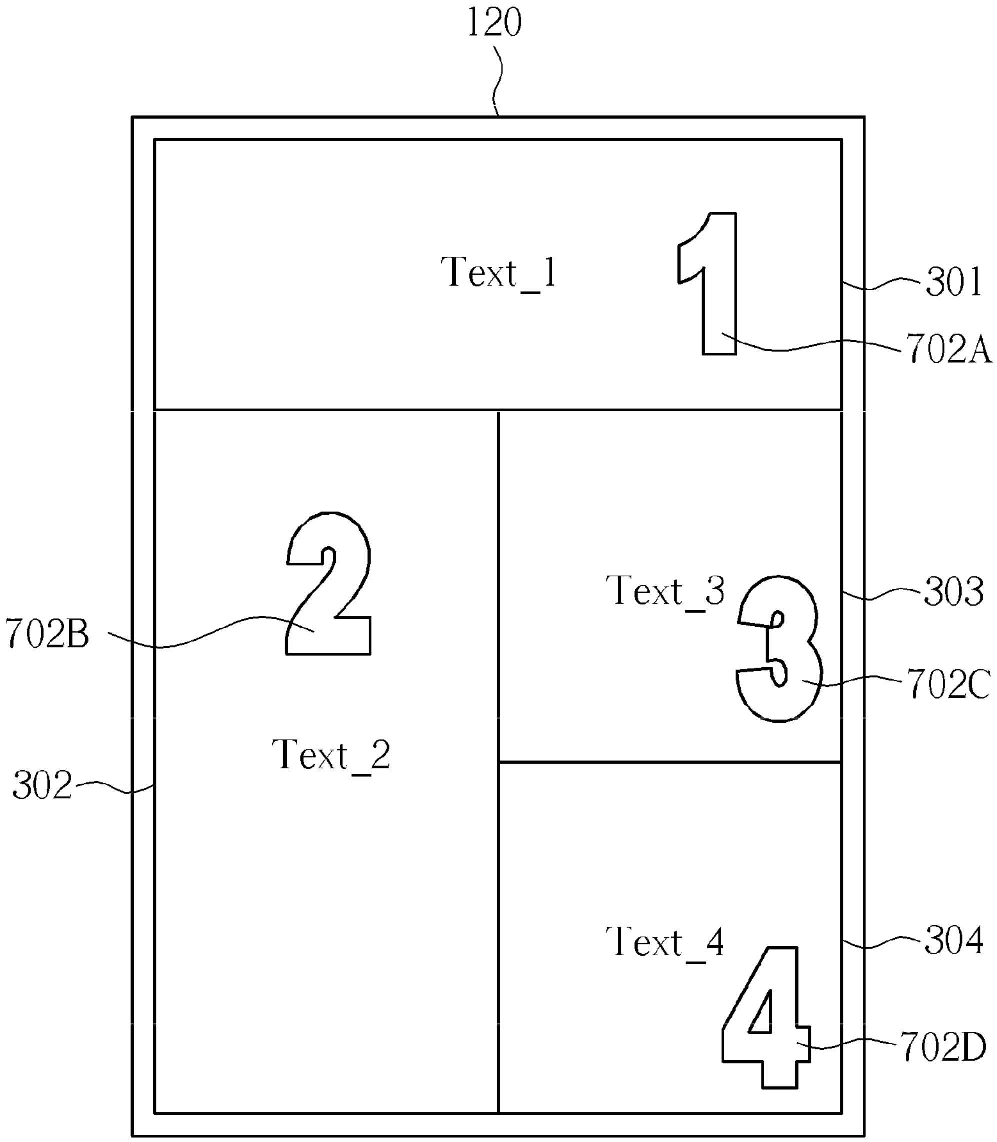
FIG. 7 is a diagram illustrating another exemplary display output of the contents of the page on the display screen when the partition mode setting includes the read mode.
Figure 8:
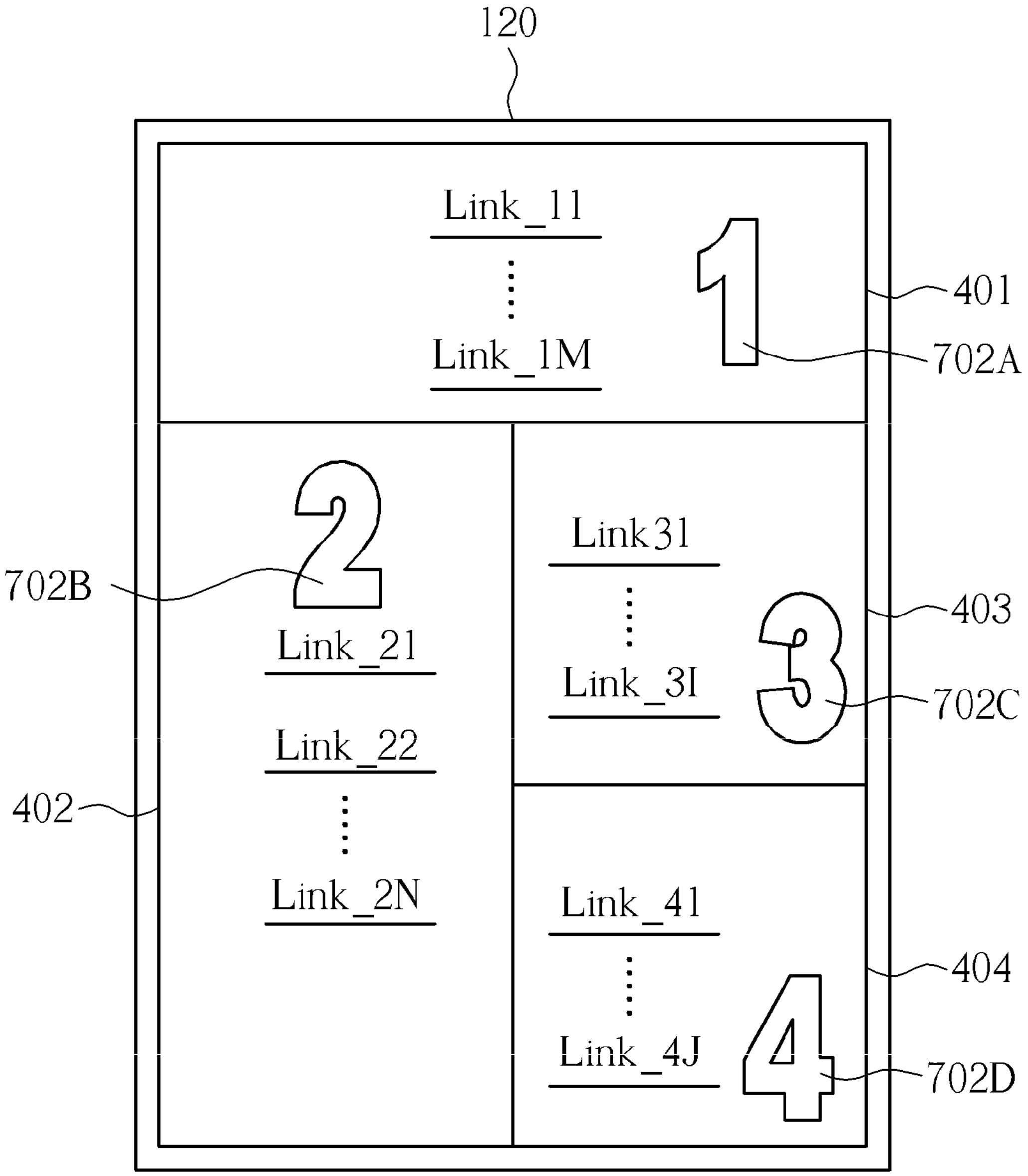
FIG. 8 is a diagram illustrating another exemplary display output of the contents of the page on the display screen when the partition mode setting includes the link mode.
Figure 9:
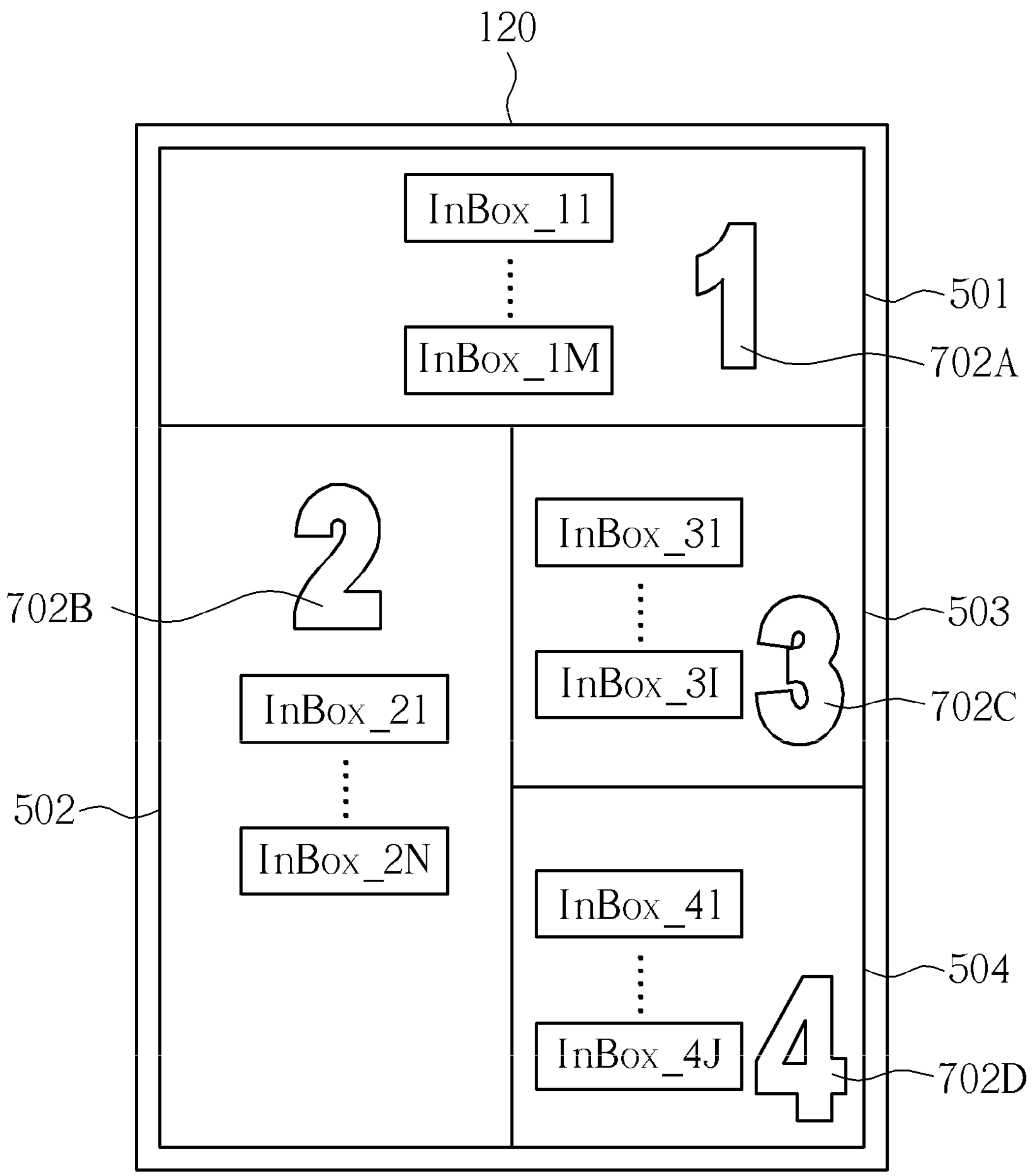
FIG. 9 is a diagram illustrating another exemplary display output of the contents of the page on the display screen when the partition mode setting includes the input mode.

Alternatively, the identifiers assigned to the data partitions are mapped to number keys 602, respectively. Thus, the user may depress one of the number keys 602 to directly select one of the display regions, thereby generating a partition selection input. To facilitate the quick region selection made by the user through using the number keys 602, auxiliary symbols may be overlaid on the display of the data partitions (i.e., the contents DATA of the page). FIG. 7 is a diagram illustrating another exemplary display output of the contents DATA of the page on the display screen 120 when the partition mode setting includes the read mode. FIG. 8 is a diagram illustrating another exemplary display output of the contents DATA of the page on the display screen 120 when the partition mode setting includes the link mode. FIG. 9 is a diagram illustrating another exemplary display output of the contents DATA of the page on the display screen 120 when the partition mode setting includes the input mode. As shown in FIG. 7-FIG. 9, four symbols 702A, 7028, 702C, and 702D are displayed in an overlay manner, and clearly inform the user of the mapping between number keys and display regions. For example, the display region 301/401/501 is mapped to the number key "1", the display region 302/402/502 is mapped to the number key "2", the display region 303/403/503 is mapped to the number key "3", and the display region 304/404/504 is mapped to the number key "4".

To put it simply, regarding the display of data partitions derived from partitioning the contents DATA of the page to be displayed, the processor 114 may control the display controller 118 to drive the display screen 120 for displaying the contents DATA of the page (e.g., a web page) completely, or may control the display controller 118 to drive the display screen 120 for displaying the contents DATA of the page (e.g., a web page) with a plurality of symbols overlaid thereon.

As mentioned above, the processor 114 refers to the partition mode setting for deciding how to partition the contents DATA of the page into data partitions. In one exemplary implementation, the partition mode setting may be a default partition mode (i.e., a pre-defined partition mode) being one of the aforementioned read mode, link mode, input mode, and mixed mode. In an alternative design, the processor 114 may adaptively configure the partition mode setting by referring to the contents DATA of the page to be displayed. For example, the contents DATA of the page is analyzed by the processor 114 to decide which partition mode should be enabled. When the contents DATA of the page only includes pure text information, the aforementioned read mode is enabled by the processor 114 automatically. When the contents DATA of the page only includes input boxes, the aforementioned input mode is enabled by the processor 114 automatically. When the contents DATA of the page only includes links, the aforementioned link mode is enabled by the processor 114 automatically. When the contents DATA of the page include one of all possible combinations of text information, input boxes, and links, the aforementioned mixed mode is enabled by the processor 114 automatically. In another alternative design, the user may manually set/change the partition mode setting through the control device 104. For example, the function key 604A shown in FIG. 6 may be used to generate a partition mode selection input for activating the read mode, the function key 604B shown in FIG. 6 may be used to generate a partition mode selection input for activating the link mode, and the function key 604C shown in FIG. 6 may be used to generate a partition mode selection input for activating the input mode.

Please refer to FIG. 2 again. The processor 114 checks if a partition selection input transmitted by the control signal SC generated from the control device 104 is received, and determines a selected data partition according to an identifier corresponding to the received partition selection input when the partition selection input is received by the interface circuit 112 (Steps 212 and 214). The processor 114 further checks if partitioning the selected data partition is still available (Step 216). When the partitioning operation is allowed to be performed upon the selected data partition, meaning that the selected data partition can be further partitioned into multiple data partitions, the processor 114 performs the same partitioning operation, which is used for partitioning the contents DATA of the page, upon the selected data partition which acts as contents of a page to be displayed on the display screen 120 (Steps 216, 218, 208, and 210). However, when the partitioning operation is not allowed to be performed upon the selected data partition, meaning that the selected data partition cannot be further partitioned into data partitions, the processor 114 would perform a specific action in response to the selected data partition (Steps 216 and 220).

Figure 10:
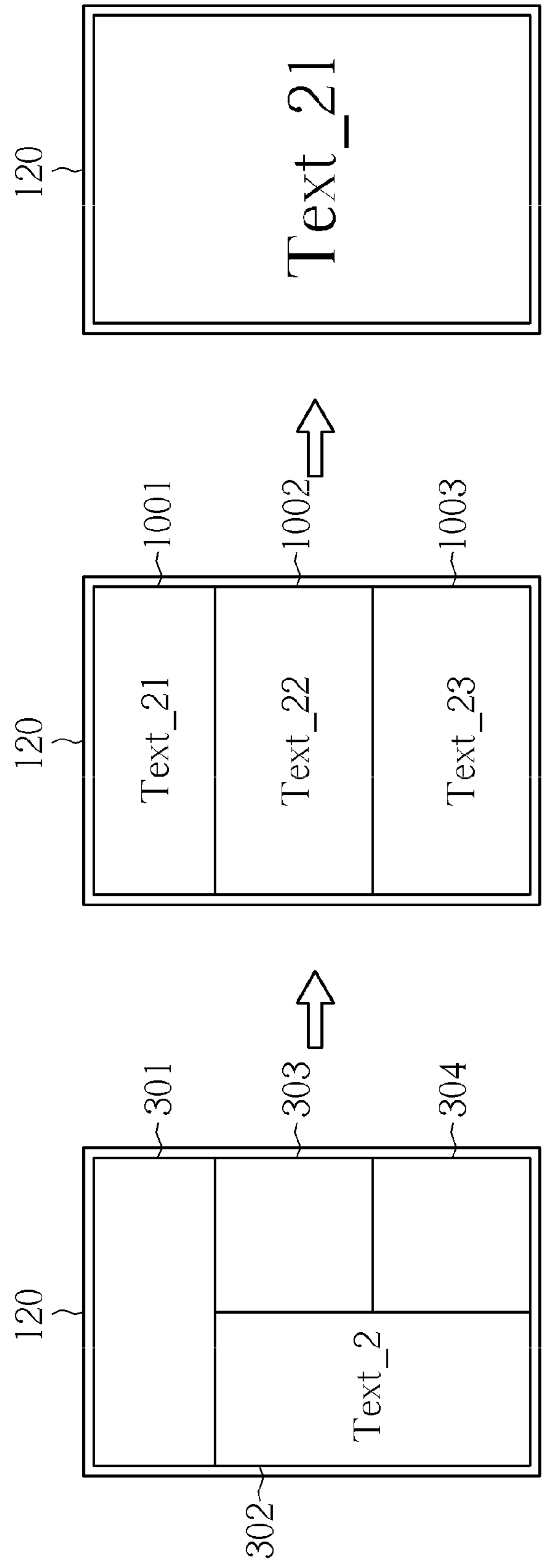
FIG. 10 is a diagram illustrating an exemplary information browsing procedure when the partition mode setting includes a read mode.

FIG. 10 is a diagram illustrating an exemplary information browsing procedure when the partition mode setting includes the read mode. Suppose that the region 302 of the display screen 120 is selected by the partition selection input made by the user. As partitioning the selected data partition corresponding to the selected region 302 is still available, the selected data partition is therefore partitioned into a plurality of data partitions to be displayed on regions 1001, 1002, and 1003, respectively. As can be seen from FIG. 10, the pure text information Text_2 originally shown on the region 302 may be zoomed in and divided into the pure text information Text_21 shown on the region 1001, the pure text information Text_22 shown on the region 1002, and the pure text information Text_23 shown on the region 1003. The user can select one of the regions 1001-1003 by using the control device 104 to generate the control signal SC carrying the partition selection input. When the region 1001 of the display screen 120 is selected by the partition selection input, the display of the pure text information Text_21 is zoomed in and displayed on the display screen 120 due to the fact that partitioning the selected data partition corresponding to the selected region 1001 is not permissible. It should be noted that, regarding the selected data partition which is generated due to the read mode, the specific action for the selected data partition in this exemplary embodiment is to zoom in the display of the selected data partition on the display screen 120.

Figure 11:
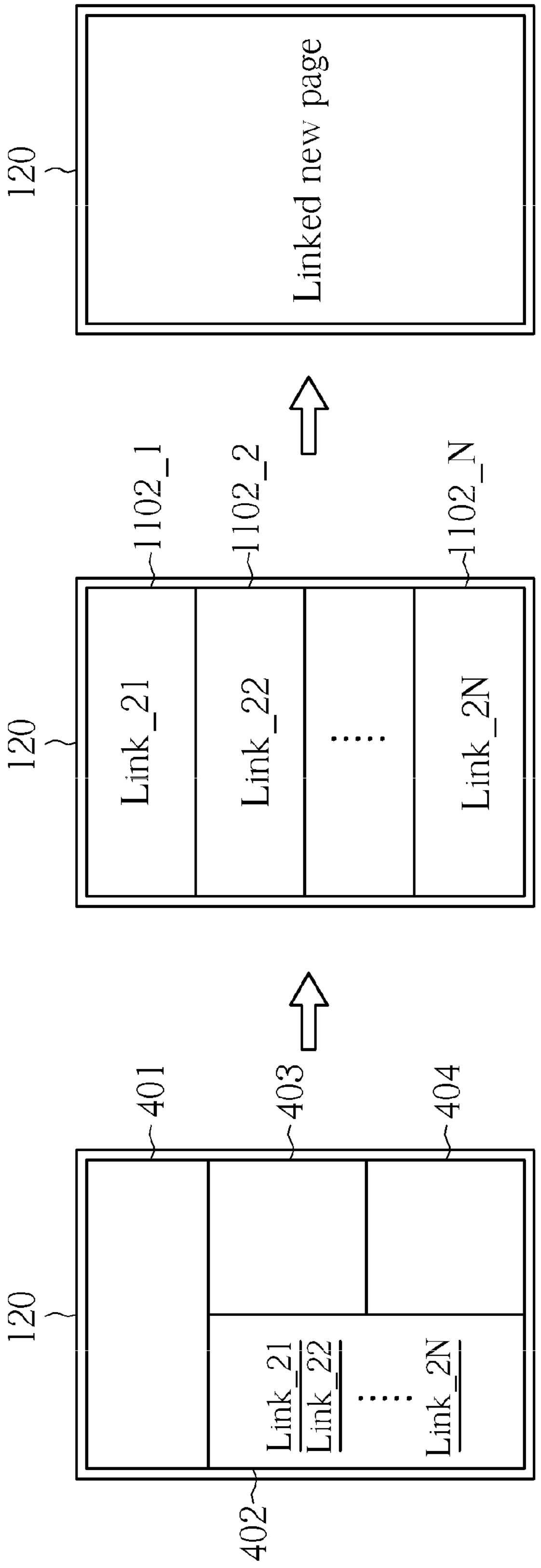
FIG. 11 is a diagram illustrating an exemplary information browsing procedure when the partition mode setting includes a link mode.

FIG. 11 is a diagram illustrating an exemplary information browsing procedure when the partition mode setting includes the link mode. Suppose that the region 402 of the display screen 120 is selected by the partition selection input made by the user. As partitioning the selected data partition corresponding to the selected region 402 is still available, the selected data partition is therefore partitioned into a plurality of data partitions to be displayed on regions 1102_1-1102_N, respectively. As can be seen from FIG. 11, the display of the link group originally shown on the region 402 may be zoomed in and divided into links Link_21-Link_2N respectively shown on the regions 1102_1-1102_N. The user can select one of the regions 1102_1-1102_N by using the control device 104 to generate the control signal SC carrying the partition selection input. When the region 1102_1 of the display screen 120 is selected by the partition selection input, the contents of another page corresponding to the selected link Link_21 is displayed on the display screen 120 due to the fact that partitioning the selected data partition corresponding to the selected region 1102_1 is not permissible. It should be noted that, regarding the selected data partition which is generated due to the link mode, the specific action for the selected data partition in this exemplary embodiment is to connect and show a linked new page.

Figure 12:
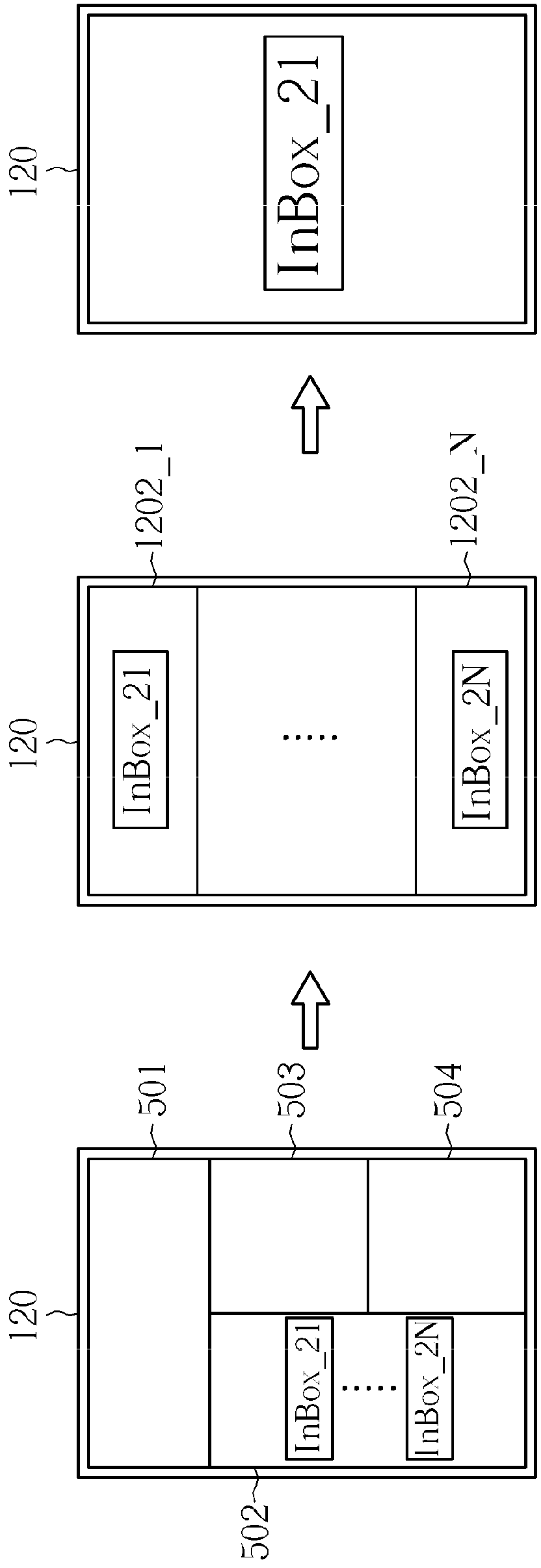
FIG. 12 is a diagram illustrating an exemplary information browsing procedure when the partition mode setting includes an input mode.

FIG. 12 is a diagram illustrating an exemplary information browsing procedure when the partition mode setting includes the input mode. Suppose that the region 502 of the display screen 120 is selected by the partition selection input made by the user. As partitioning the selected data partition corresponding to the selected region 502 is still available, the selected data partition is therefore partitioned into a plurality of data partitions to be respectively displayed on regions 1202_1-1202_N. As can be seen from FIG. 12, the display of the input box group originally shown on the region 502 may be zoomed in and divided into input boxes InBox_21-InBox_2N respectively shown on the regions 1202_1-1202_N. The user can select one of the regions 1202_1-1202_N by using the control device 104 to generate the control signal SC carrying the partition selection input. When the region 1202_1 of the display screen 120 is selected by the partition selection input, a character input is received through the selected input box InBox_21 due to the fact that partitioning the selected data partition corresponding to the selected region 1202_1 is not permissible. It should be noted that, regarding the selected data partition which is generated due to the input mode, the specific action for the selected data partition in this exemplary embodiment is to receive a character input.

Briefly summarized, the present invention uses a hierarchical structure to partition contents of a page. The contents of the page to be displayed are at the highest level. When the user navigates to a selected data partition at the lowest level, a specific action is performed in response to the selected data partition. With the help of partitioning the contents of the page into data partitions, the user can easily and conveniently browse the desired information included in the contents of the page.

Those skilled in the art will readily observe that numerous modifications and alterations of the device and method may be made while retaining the teachings of the invention.

What is claimed is:

1. An information browsing method, comprising:

partitioning contents of a page into a plurality of first data partitions by analyzing the contents of the page, wherein a partition arrangement of the first data partitions is determined by analyzing the contents of the page;

assigning a plurality of first identifiers to the first data partitions, respectively;

driving a display screen according to at least the first data partitions; and when receiving a partition selection input, determining a selected first data partition according to a first identifier corresponding to the partition selection input, wherein the selected first data partition is assigned with the first identifier;

wherein partitioning the contents of the page into the first data partitions comprises:

partitioning the contents of the page into the first data partitions according to an analyzing result of the contents of the page and a partition mode setting, wherein when the partition mode setting is a first partition mode, the partition arrangement of the first data partitions is a first partition arrangement; and when the partition mode setting is a second partition mode different from the first partition mode, the partition arrangement of the first data partitions is a second partition arrangement different from the first partition arrangement.

2. The information browsing method of claim 1, wherein driving the display screen according to at least the first data partitions comprises:

displaying the contents of the page completely on the display screen.

3. The information browsing method of claim 1, wherein driving the display screen according to at least the first data partitions comprises:

displaying the contents of the page with a plurality of symbols overlaid thereon by driving the display screen according to the first data partitions and the first identifiers, wherein the symbols correspond to the first identifiers, respectively.

4. The information browsing method of claim 1, wherein the partition mode setting is a default partition mode.

5. The information browsing method of claim 1, wherein partitioning the contents of the page into the first data partitions further comprises:

receiving a partition mode selection input; and configuring the partition mode setting according to the partition mode selection input.

6. The information browsing method of claim 1, wherein partitioning the contents of the page into the first data partitions further comprises:

adaptively configuring the partition mode setting by referring to the contents of the page.

7. The information browsing method of claim 1, wherein partitioning the contents of the page into the first data partitions according to the partition mode setting comprises:

when the partition mode setting includes a read mode, partitioning the contents of the page into the first data partitions having at least one data partition which only includes pure text information to be shown on the display screen.

8. The information browsing method of claim 7, wherein the selected first data partition belongs to the at least one data partition, and the information browsing method further comprises:

zooming in display of the selected first data partition on the display screen.

9. The information browsing method of claim 1, wherein partitioning the contents of the page into the first data partitions according to the partition mode setting comprises:

when the partition mode setting includes a link mode, partitioning the contents of the page into the first data partitions having at least one data partition which only includes one or more links to be shown on the display screen.

10. The information browsing method of claim 9, wherein the selected first data partition belongs to the at least one data partition and includes a specific link, and the information browsing method further comprises:

displaying contents of another page corresponding to the specific link on the display screen.

11. The information browsing method of claim 1, wherein partitioning the contents of the page into the first data partitions according to the partition mode setting comprises:

when the partition mode setting includes an input mode, partitioning the contents of the page into the first data partitions having at least one data partition which only includes one or more input boxes to be shown on the display screen.

12. The information browsing method of claim 11, wherein the selected first data partition belongs to the at least one data partition and includes a specific input box, and the information browsing method further comprises:

receiving a character input through the specific input box.

13. The information browsing method of claim 1, wherein partitioning the contents of the page into the first data partitions comprises:

displaying the contents of the page on the display screen; and after the contents of the page are displayed on the display screen, starting partitioning the contents of the page in response to a cursor movement.

14. The information browsing method of claim 1, further comprising:

partitioning the selected first data partition into a plurality of second data partitions by analyzing the selected first data partition;

assigning a plurality of second identifiers to the second data partitions, respectively; and driving the display screen according to at least the second data partitions.

15. The information browsing method of claim 1, wherein the page is a web page.

16. A non-transitory machine-readable medium storing a computer program, wherein when executed by a processor, the computer program enables the processor to perform at least the following steps:

partitioning contents of a page into a plurality of first data partitions by analyzing the contents of the page, wherein a partition arrangement of the first data partitions is determined by analyzing the contents of the page;

assigning a plurality of first identifiers to the first data partitions, respectively;

controlling a display controller to drive a display screen according to at least the first data partitions; and when receiving a partition selection input, determining a selected first data partition according to a first identifier corresponding to the partition selection input, wherein the selected first data partition is assigned with the first identifier;

wherein partitioning the contents of the page into the first data partitions comprises:

partitioning the contents of the page into the first data partitions according to an analyzing result of the contents of the page and a partition mode setting, wherein when the partition mode setting is a first partition mode, the partition arrangement of the first data partitions is a first partition arrangement; and when the partition mode setting is a second partition mode different from the first partition mode, the partition arrangement of the first data partitions is a second partition arrangement different from the first partition arrangement.

17. The machine-readable medium of claim 16, wherein controlling the display controller to drive the display screen according to at least the first data partitions comprises:

displaying the contents of the page completely on the display screen.

18. The machine-readable medium of claim 16, wherein controlling the display controller to drive the display screen according to at least the first data partitions comprises:

displaying the contents of the page with a plurality of symbols overlaid thereon by driving the display screen according to the first data partitions and the first identifiers, wherein the symbols correspond to the first identifiers, respectively.

19. The machine-readable medium of claim 16, wherein the partition mode setting is a default partition mode.

20. The machine-readable medium of claim 16, wherein partitioning the contents of the page into the first data partitions further comprises:

receiving a partition mode selection input; and configuring the partition mode setting according to the partition mode selection input.

21. The machine-readable medium of claim 16, wherein partitioning the contents of the page into the first data partitions further comprises:

adaptively configuring the partition mode setting by referring to the contents of the page.

22. The machine-readable medium of claim 16, wherein partitioning the contents of the page into the first data partitions according to the partition mode setting comprises:

when the partition mode setting includes a read mode, partitioning the contents of the page into the first data partitions having at least one data partition which only includes pure text information to be shown on the display screen.

23. The machine-readable medium of claim 22, wherein the selected first data partition belongs to the at least one data partition, and when executed by the processor, the computer program further enables the processor to perform the following step:

zooming in display of the selected first data partition on the display screen.

24. The machine-readable medium of claim 16, wherein partitioning the contents of the page into the first data partitions according to the partition mode setting comprises:

when the partition mode setting includes a link mode, partitioning the contents of the page into the first data partitions having at least one data partition which only includes one or more links to be shown on the display screen.

25. The machine-readable medium of claim 24, wherein the selected first data partition belongs to the at least one data partition and includes a specific link, and when executed by the processor, the computer program further enables the processor to perform the following step:

displaying contents of another page corresponding to the specific link on the display screen.

26. The machine-readable medium of claim 16, wherein partitioning the contents of the page into the first data partitions according to the partition mode setting comprises:

when the partition mode setting includes an input mode, partitioning the contents of the page into the first data partitions having at least one data partition which only includes one or more input boxes to be shown on the display screen.

27. The machine-readable medium of claim 26, wherein the selected first data partition belongs to the at least one data partition and includes a specific input box, and when executed by the processor, the computer program further enables the processor to perform the following step:

receiving a character input through the specific input box.

28. The machine-readable medium of claim 16, wherein partitioning the contents of the page into the first data partitions comprises:

displaying the contents of the page on the display screen; and after the contents of the page are displayed on the display screen, starting partitioning the contents of the page in response to a cursor movement.

29. The machine-readable medium of claim 16, wherein when executed by the processor, the computer program further enables the processor to perform the following steps:

partitioning the selected first data partition into a plurality of second data partitions by analyzing the selected first data partition;

assigning a plurality of second identifiers to the second data partitions, respectively; and controlling the display controller to drive the display screen according to at least the second data partitions.

30. The machine-readable medium of claim 16, wherein the page is a web page.

* * * * *